United States Patent [19]
Kress

[11] Patent Number: 5,783,020
[45] Date of Patent: Jul. 21, 1998

[54] MOUNTING CLIP

[75] Inventor: Ronald D. Kress, 41526 Clairpointe, Harrison Township, Macomb County, Mich. 48045

[73] Assignee: Ronald D. Kress, Harrison Township, Mich.

[21] Appl. No.: 582,929

[22] Filed: Jan. 4, 1996

[51] Int. Cl.$^6$ ................................ B60R 13/04
[52] U.S. Cl. ............... 156/291; 52/716.6; 52/718.04
[58] Field of Search ................ 156/71, 289, 291; 52/716.5, 716.6, 716.7, 718.01, 718.04

[56] References Cited

U.S. PATENT DOCUMENTS

| | | |
|---|---|---|
| 2,839,126 | 6/1958 | O'Neill . |
| 3,606,431 | 9/1971 | Kunevicius . |
| 3,703,747 | 11/1972 | Hamman ............................ 52/716.6 |
| 3,856,194 | 12/1974 | Helm . |
| 3,916,055 | 10/1975 | Wagner . |
| 4,328,052 | 5/1982 | Watanabe ........................... 52/716.6 |
| 4,709,525 | 12/1987 | Adell . |
| 4,869,937 | 9/1989 | Nagata . |
| 4,878,273 | 11/1989 | West ................................... 52/716.6 |
| 5,134,829 | 8/1992 | Kress ................................. 52/716.5 |
| 5,353,571 | 10/1994 | Berdan ............................... 52/716.6 |

FOREIGN PATENT DOCUMENTS 0452375  8/1936  United Kingdom .

OTHER PUBLICATIONS

PCT International Application, International Publication No.: WO 92/17663; International Publication Date: 15 Oct. 1992; Entitled: "Clip for Mounting Molding".

*Primary Examiner*—Daniel Stemmer
*Attorney, Agent, or Firm*—Howard & Howard

[57] ABSTRACT

A unique clip for holding moldings or other items to a base surface includes bearing surfaces which are spaced laterally inwardly from outermost edges of an underlying substrate. Due to the inward position of the bearing surfaces, a force transferred to the bearing surfaces will be a plucking force rather than a peeling force as may have occurred with the prior art. In other features of this invention, the clip is formed with non-planar support structure for unusually wide applications. Further, in a method of utilizing the inventive clip, a single backing cover is placed over the adhesive strips of several spaced clips. Thus, an assembler need only remove one cover, and then place the molding on the body of a vehicle.

13 Claims, 4 Drawing Sheets

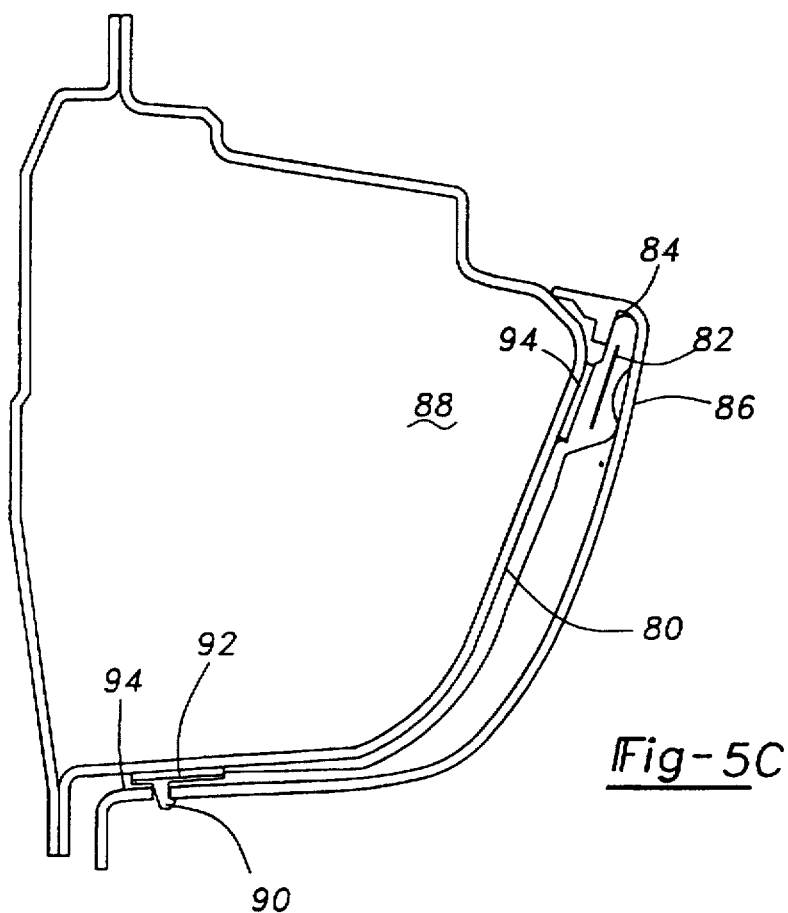
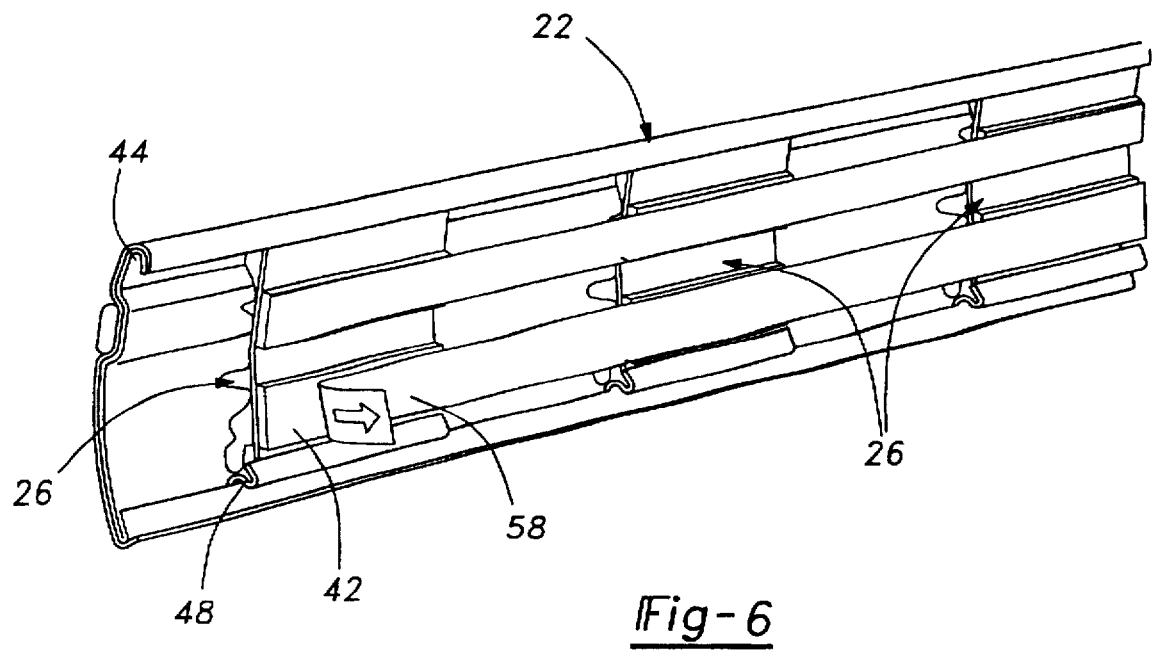

MOUNTING CLIP

BACKGROUND OF THE INVENTION

The present invention relates generally to a clip which allows an item to be mounted to a structure. In particular, the invention relates to improvements in the clip and molding combinations described in U.S. Pat. No. 5,134,829, issued Aug. 4, 1992 and PCT International Publication WO 92/17663, published Oct. 15, 1992.

Moldings on a vehicle body are currently mounted in a variety of ways. The moldings may be attached to the vehicle body with common fastening elements such as a plug inserted into a hole in the vehicle body. An example of this type of mount are weld studs which attach clips to the body for securing the molding. This mounting design is relatively expensive and requires a hole to be formed in the vehicle body. The hole in the vehicle body provides a source for corrosion in the vehicle panel. Thus, this design has some undesirable characteristics.

Adhesive strips have also been utilized on the back of moldings to secure the molding to the vehicle body. These strips have typically included adhesive extending for the entire length of the molding member. This mounting design requires the molding to have a proper surface on the molding member to receive the adhesive. Further, replacement of the molding is difficult with these types of moldings if the molding is damaged. Thus, this mounting design also has undesirable characteristics.

The above-referenced patents disclose a successful clip and molding combination. Spaced clips carry the adhesive to secure the molding to the vehicle. There are some areas of such combinations which could be improved. During securement of the clip and molding to a vehicle body, forces may be transferred through a molding to the clip such that the adhesive on the clip tends to peel away from the vehicle body. Also, the prior clip and molding combinations may lack sufficient rigidity for use with a relatively wide molding. It would also be desirable to improve the method of attachment of these clips.

SUMMARY OF THE INVENTION

In a disclosed embodiment of the present invention, clips are mounted at spaced locations on a rear face on an item such as a molding for a vehicle body. The clips have adhesive strips on a rear face which secures the item to a structure. In a preferred embodiment, moldings are secured to a vehicle body. The clips have a substrate adjacent the adhesive strips. A plurality of bearing surfaces extend from the substrate in a direction towards the item. The bearing surfaces are spaced from the lateral edges of the clip.

During attachment of the clip and molding combination to the vehicle body, a roller element is rolled along the front face of the molding. As the roller rolls along the molding, a force is transferred through the rear face of the molding through the bearing surfaces such that the adhesive faces wet out the vehicle body. When the roller rolls along the molding, edges of the molding are typically forced against a surface of a vehicle. This causes a reaction force from the molding back away from the vehicle on the bearing surfaces which are held in channels at the outer edges of the molding. The bearing surfaces then transfer this force to the substrate. In the prior art, since the bearing surfaces were formed at the lateral edges of the clip, this force became a peeling force tending to peel the clip and its adhesive strip away from the vehicle. The inventive bearing surfaces, which are spaced laterally inwardly from the outer edges of the clip, transfer that same force to the adhesive strip as a plucking force spaced laterally inwardly from the edges. The plucking force necessary to remove the strip is much higher than the peeling force necessary. As such, this feature of the invention greatly improves the holding force holding the clip on the vehicle.

In another embodiment of the present invention, the substrate of the clip includes a non-planar support between the lateral edges of the clip. This allows the use of the clips for a relatively wide molding. Preferably, the support includes waves in the substrate.

In yet another embodiment of the present invention, a plurality of clips are carried on the rear face of a molding. Each clip has an adhesive strip facing rearwardly of the molding. A removable tape overlies the adhesive strips of the clips. In a disclosed method of mounting a molding onto a vehicle body, a single removable cover is placed on the adhesive strips of several clips. At the assembly line the cover is removed. The molding and clip combination is located on the vehicle body with the adhesive faces facing the vehicle body. A force is then applied to the molding, wetting out the adhesive and bonding the clips to the vehicle body.

These and other features of the present invention will be best understood from the following specification and drawings, of which the following is a brief description.

BRIEF DESCRIPTION OF THE DRAWINGS

FIG. 3 is a detailed view of an upper portion of a clip according to the present invention;

FIG. 4 is a detailed view of a lower portion of a clip according to the present invention;

FIG. 5C is a view showing another application; and

FIG. 6 is a perspective view of a molding and clip combination according to the present invention.

DETAILED DESCRIPTION OF A PREFERRED EMBODIMENT OF THE INVENTION

The present invention relates generally to improvements in the clip and molding combinations described in U.S. Pat. No. 5,134,829, and in PCT International Publication WO 92/17663 and, thus, incorporates the disclosures herein by reference.

Figure 1:
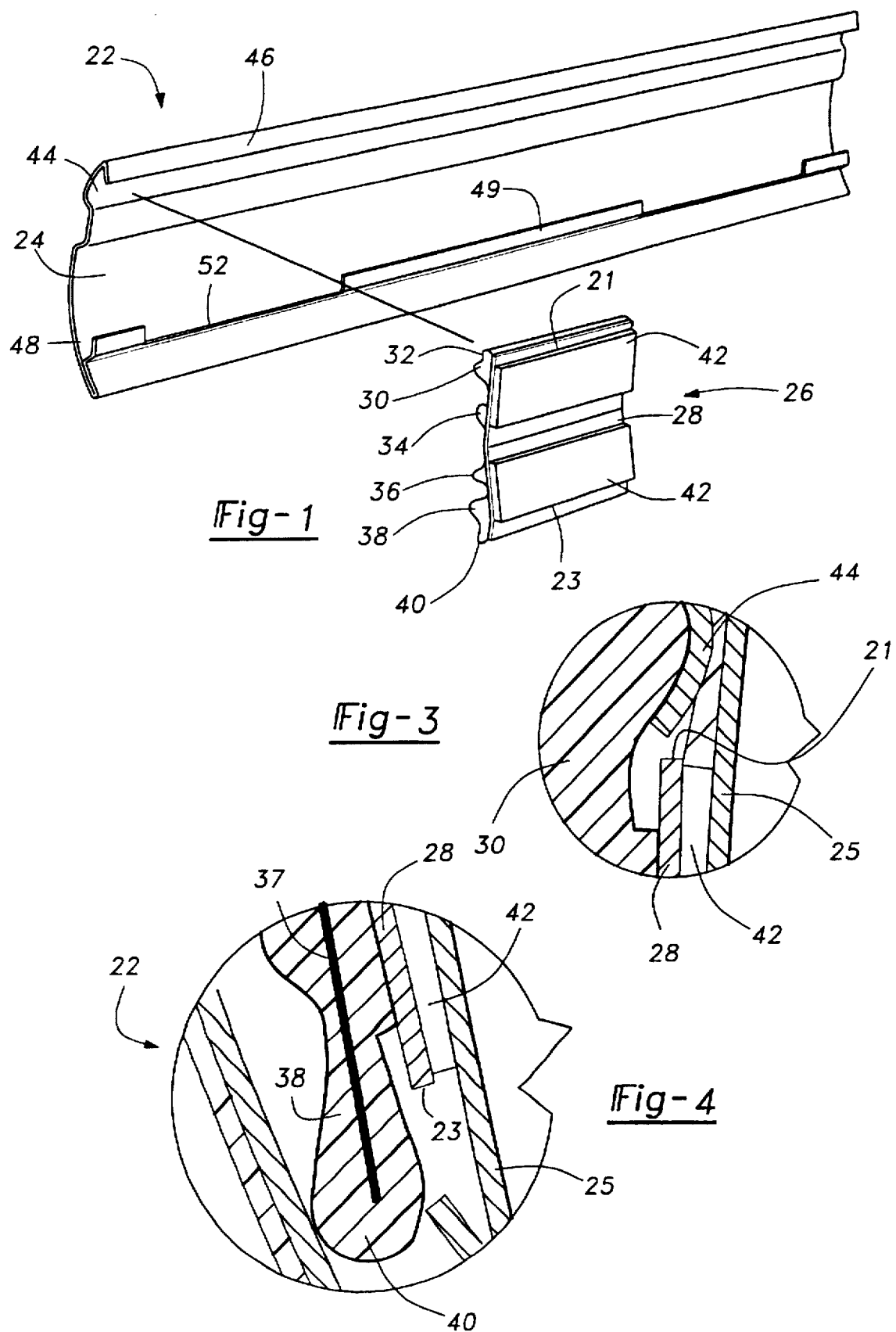
FIG. 1 is a rear assembly view showing a molding and clip member according to the present invention.

As shown in FIG. 1, a molding 22 has an inner or rear face 24 which receives clip 26. Clip 26 has opposed lateral edges 21 and 23. Clip 26 includes a substrate 28 having a hill or bearing surface 30 adjacent lateral edge 21 which has an end curve 32. Bearing surfaces 34 and 36 are at central locations on substrate 28. Bearing surface 38 is adjacent opposed lateral edge 23 of clip 26 and has an end curve 40. The bearing surfaces are preferably molded onto substrate 28 from a suitable plastic. Substrate 28 preferably consists of a metal such as aluminum, but may comprise any relatively rigid material, including plastics, composites or other appropriate materials. Adhesive strips 42 are placed on a rear face of substrate 28.

Clip 26 may be received within channel 44, defined by flange 46 on molding rear face 24, and channel 48 defined by flange 49 at the opposed end of molding 22. End curves 32 and 40 of hills 30 and 38, respectively, may be shaped such that they basically conform to the inner periphery of channels 44 and 48, respectively.

As disclosed in the above-referenced patent applications, clips may enter into the channels through openings 52 which extend for a greater length than the length of clip 26. Thus, clip 26 may be aligned with an opening 52 and end curve 32 inserted within channel 44. Clip 26 may then be slid within channel 44 until end curve 40 moves into channel 48. Clip 26 is now secured on molding 22 between channels 44 and 48, as shown in FIGS. 4 and 6. Alternatively, the clips may enter the channel by some other means. As one example, the clips may snap into the channels as disclosed in the above-referenced PCT application. Adhesive strips 42 then face rearwardly of molding 22 to attach molding 22 to a vehicle body.

Figure 2:
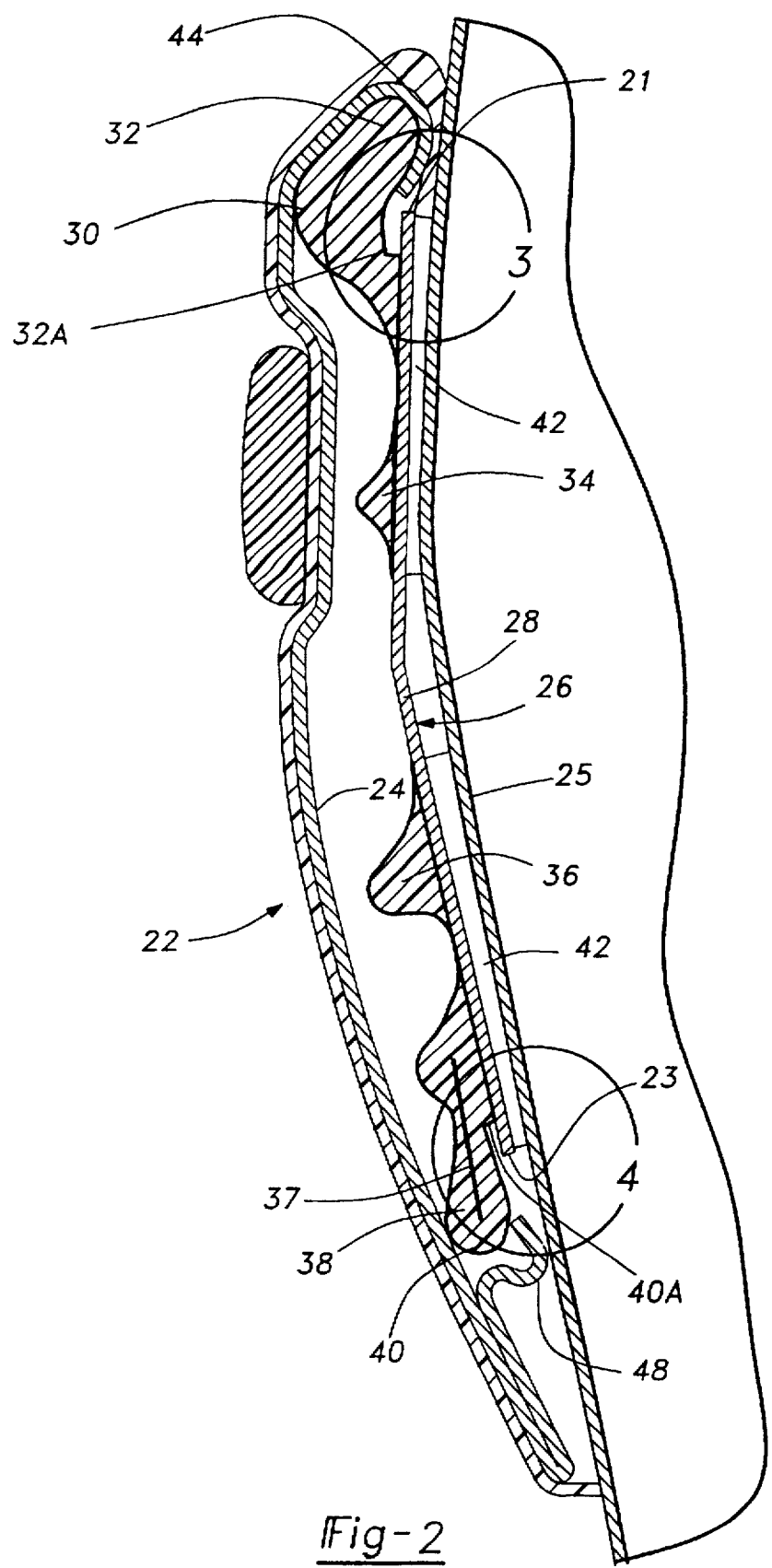
FIG. 2 is a cross-sectional view of a clip and molding combination according to the present invention.

As shown in FIG. 2, bearing surfaces 30, 34, 36 and 38 all extend forwardly from substrate 28. Bearing surfaces 30 and 38 are spaced inwardly from lateral edges 21 and 23, respectively. In certain clips, bearing surface 38 may include a stiffener 37 which provides lateral support to the bearing surface 38, particularly when bearing surface 38 overhangs the lateral edge 21 of clip 26. Stiffener 37 may comprise any material which provides rigidity, such as an aluminum strip embedded in bearing surface 38. Stiffener 37 preferably runs along substantially the entire length of clip 26. There may be a slight clearance between the rear face 24 of molding 22 and the bearing surface. Adhesive strips 42 are in contact with an outer body side 25 of a vehicle to secure molding 22 to the vehicle. Substrate 28 is preferably shaped to approximate the shape of the body side 25. End curves 32 and 40 are received at the inner periphery of channels 44 and 48, respectively. Bearing surfaces 34, 36 and 38 may optionally have crushable fins 54, as described in the above-referenced patents.

The end curves 32 and 40 extend laterally outwardly beyond the laterally outer most portions 32A, 40A of the bearing surfaces which are attached to the substrate 28. In a sense, the end curves 32 and 40 overhang the lateral edges. Also, the adhesive strips 42 extend laterally outwardly of the laterally outermost portions 32A, 40A of the bearing surfaces which is attached to the substrate 28. As will be explained below, this provides improved tape retention strength.

Separate adhesive strips 42 are associated with the two lateral edges of clip 26. Bearing surface 30 and bearing surface 34 are associated with the top and inner end of the uppermost adhesive strip 42, while bearing surfaces 36 and 38 are respectively associated with the bottom and inner end of the bottom most adhesive strip 42. The bearing surfaces associated with each of the tape strips ensures proper transfer of the force to each of the tape strips and a high degree of wetting on the surface area of the tape.

As shown in FIG. 3, bearing surface 30 extends from substrate 28 beginning at a position laterally inwardly from lateral edge 21 of clip 26. End curve 32 of bearing surface 30 may extend laterally beyond the lateral edge 21 of clip 26.

As shown in FIG. 4, end curve 40 of bearing surface 38 extends laterally beyond the opposed lateral edge 23 of clip 26. Thus, a portion of the substrate 28 adjacent lateral edges 21 and 23 have no bearing surfaces extending from the substrate 28.

During attachment of the clip 26 and molding 22 combination to the vehicle body side 25, a roller element is rolled along molding 22. As the roller rolls along the molding, a force is transferred through the rear face 24 of molding 22 and through the bearing surface such that adhesive strips wet out onto body side 25, securing molding 22 to the vehicle. When the roller rolls along the molding, the molding is forced towards the vehicle body. As shown in the drawings, the molding may be typically spaced slightly away from the vehicle body. However, when the roller contacts the molding, the molding is forced into contact with the vehicle body. This causes a reaction force back into the molding. The molding transfers that force to the end curves 32 and 40 through the channels 44 and 48. The end curves 32 and 42 of the bearing surfaces then apply that reaction force to the substrate. Since bearing surfaces 30 and 38 are connected to the substrate at locations 32A and 40A spaced laterally inwardly from the edge of the substrate, and importantly are spaced laterally inwardly from the laterally outermost portion of the adhesive strips 42, this force is a plucking force. The adhesive strips 42 have a much greater resistance to a plucking force than they would have to a peeling force. As such, the adhesive strips 42 are more likely to retain their connection to the vehicle body.

Figure 5A:
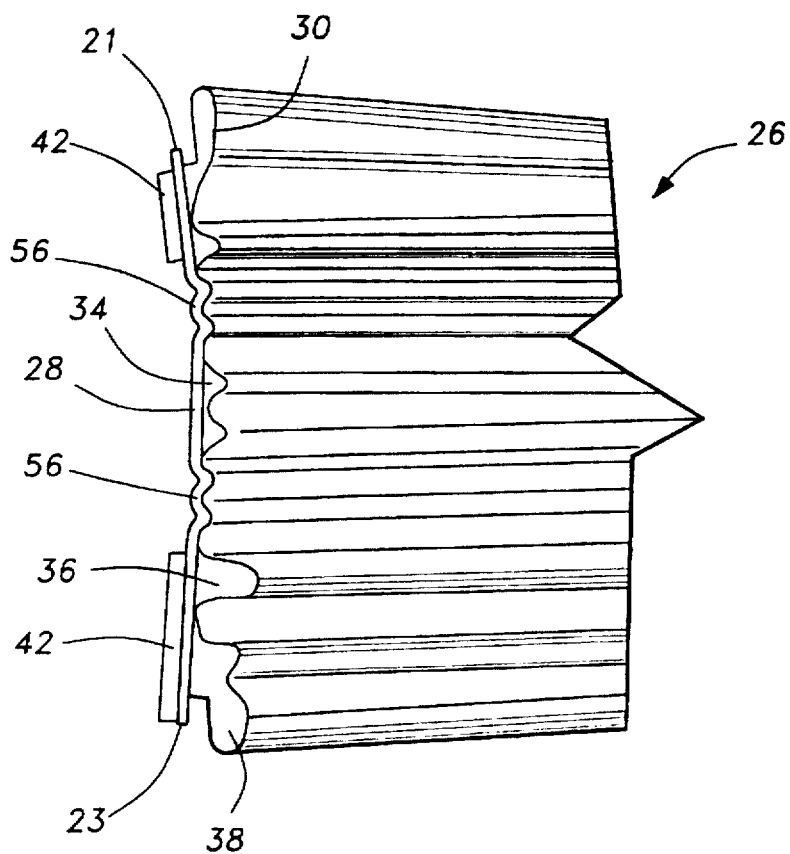
FIG. 5A is a perspective view of another clip feature according to the present invention.

FIG. 5A illustrates an alternative embodiment of a clip 26. Clip 26 includes a metal substrate 28, bearing surfaces 30, 34 and 38 and adhesive strips 42. This embodiment is useful when the lateral distance between edges 21 and 23 is significantly greater. Clip 26 includes a non-planar support surface 56. Substrate 28 provides support between bearing surfaces 30 and 34 and bearing surfaces 34 and 38. Support 56 includes waves in substrate 28, as shown in FIG. 5A.

Figure 5B:
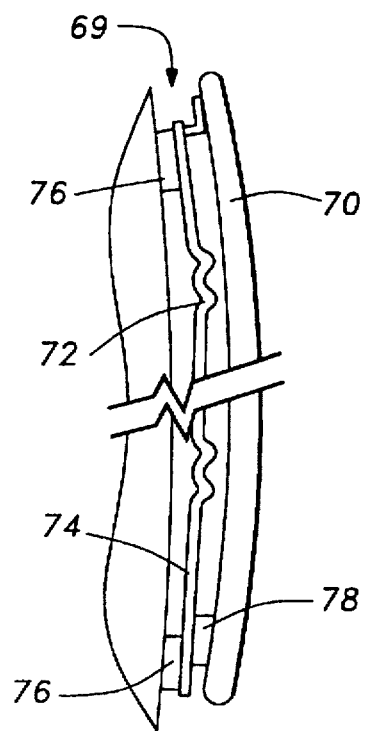
FIG. 5B is a view showing another application.

As shown in FIG. 5B, an inventive clip 69 can be utilized for non-molding applications such as attaching an interior door panel 70 within a vehicle body. The inventive clip 69 utilized for this application may have a plurality of waves or other support structure 72 formed across the lateral width of substrate 74. Adhesive strips 76 attach the clip 69 to a substrate. Another strip 78 secures one end of the clip 69 to the door panel. By utilizing this substrate 74 having the plurality of waves, one provides a more rigid structure within the door panel. By carefully designing the clip, one may be able to eliminate the door beams typically required inside a door panel. Thus, in this embodiment, the single clip can be utilized both to attach the interior door panel, and also to replace the previously required beam.

As shown in FIG. 5C, clip 80 may have a bearing surface 82 retained in a channel 84 in a molding 86. Molding 86 curves under a vehicle body 88 and receives a snap tab 90 into a slot 92 to hold the molding. Adhesive strips 94 hold clip 80 on body 88.

Another feature of the invention is shown in FIG. 6, in which the method of assembling moldings utilizing the inventive clip is improved. A plurality of clips 26 are received in molding 22 at predetermined positions. Adhesive strips 42 face rearwardly to attach molding 22 to a vehicle body. A manufacturer of the clip or molding will place a plurality of the clips 26 in the molding 22. The adhesive backing on the adhesive strips 42 is then removed. A backing cover 58 is placed over the adhesive faces 42 of clips 26 prior to attachment to a vehicle body. Backing cover 58 can be removed from clips 26, exposing adhesive strips 42. In a method of mounting a molding onto a vehicle body, a molding and clip combination is provided with a plurality of clips carried on the rear face of the molding. A backing cover 58 overlies the adhesive strips of the clips 26 prior to attachment to a vehicle body, for example, during shipment of the molding and clip combination. Thus, the molding or clip manufacturer can ship a molding 22 with the clips 26 already positioned at the desired location, and with a single removable cover 58 covering a plurality of the adhesive strips 42 on a plurality of the clips 26. At the assembly location, cover 58 is removed from the adhesive strips of clips 26, the molding and clip combination is located on the vehicle body with the adhesive strips facing the vehicle body. A force is then applied to the molding 22, adhesively bonding the clips 26 to the vehicle body and mounting the molding onto the vehicle body.

Although this invention is specifically disclosed for attaching moldings and door panels, any item may also be attached with the inventive clip combination. This would also apply to non-vehicle based items.

A preferred description of this invention has been disclosed; however, a worker of ordinary skill in the art would recognize that certain modifications would come within the scope of this invention. For that reason, the following claims should be studied in order to determine the true scope and content of this invention.

I claim:

1. A combination for securing an item to a structure comprising:

an item having a front face and a rear face and extending axially along an axis for a first length; and a clip carried on said rear face of said item, said clip extending along said axis for a length less than said first length, an adhesive face facing rearwardly of said front face, a substrate positioned between said item and said adhesive face, and having opposed lateral edges, and a plurality of plastic bearing surfaces extending from said substrate in a direction towards said item, wherein said bearing surfaces are spaced from said lateral edges of said substrate; and at least one of said bearing surfaces receiving a metal stiffener.

2. A combination for securing an item to a structure comprising:

an item having a front face and a rear face and extending axially along an axis for a first length;

a clip carried on said rear face of said item, said clip extending along said axis for a length less than said first length, an adhesive face facing rearwardly of said front face, a substrate positioned between said item and said adhesive face, and having opposed lateral edges, and a plurality of plastic bearing surfaces extending from said substrate in a direction towards said item, wherein said bearing surfaces are spaced from said lateral edges of said substrate said bearing surfaces have a laterally outermost attachment portion attached to said substrate at a position spaced laterally inwardly from said opposed lateral edges but have an overhung end portion extending laterally outwardly beyond said laterally outermost attachment portion; and said overhung portions extend laterally outwardly beyond a laterally outermost edge of said substrate.

3. A combination for securing a part to a vehicle body comprising:

a part having a front face and a rear face and extending axially along an axis for a first length;

a clip carried on said rear face of said part, said clip extending along said axis for a length less than said first length, and having opposed lateral edges defined perpendicularly from said axis, an adhesive face adjacent each lateral edge facing rearwardly of said part, a substrate positioned between said part and said adhesive face, and a plurality of bearing surfaces extending from said substrate in a direction towards said part, wherein said substrate has a non-planar support structure between said lateral edges; and said support surface including waves in said substrate disposed between said bearing surfaces, said waves providing lateral support to said clip.

4. The combination as recited in claim 3, wherein said substrate is a metal substrate.

5. The combination as recited in claim 3, wherein said bearing surfaces are spaced from said lateral edges.

6. A combination as recited in claim 3, wherein said part is an outer vehicle body molding.

7. A combination for securing a part to a vehicle body comprising:

a part having a front face and a rear face and extending axially along an axis for a first length, a clip, carried on said rear face of said part, said clip extending along said axis for a length less than said first length, and having opposed lateral edges defined perpendicularly from said axis, an adhesive face adjacent each lateral edge facing rearwardly of said part, a substrate positioned between said part and said adhesive face, and a plurality of bearing surfaces extending from said substrate in a direction towards said part, wherein said substrate has a non-planar support structure between said lateral edges; and said part is an interior door panel.

8. A combination for securing a molding to a vehicle body comprising:

a molding having a front face and a rear face and extending along an axis for a first length;

a plurality of clips carried on said rear face of said molding, each of said clips extending along said axis for a length less than said first length, and having opposed lateral edges defined perpendicular to said axis, an adhesive strip facing rearwardly of said molding, a substrate positioned between said molding and said adhesive strip, and a bearing surface extending from said substrate in a direction towards said molding; and a single removable cover overlying said adhesive strips of said plurality of said clips.

9. The combination as recited in claim 8, wherein there are a pair of spaced adhesive strips and bearing surfaces associated with each of said clips.

10. The combination as recited in claim 8, wherein said substrate is a metal.

11. The combination as recited in claim 8, wherein said molding has at least one channel and said clip is received in said channel.

12. A method of mounting a molding onto a vehicle body, said method comprising the steps of:

providing a molding having a front face and a rear face and extending along an axis for a first length;

providing a plurality of clips spaced along said axis and disposed adjacent said rear face of said molding, wherein each of said clips extend for a length less than said first length, and have opposed lateral edges defined perpendicularly to said axis, an adhesive face, a substrate disposed adjacent said adhesive face, and a plurality of bearing surfaces extending from said substrate in a direction away from said adhesive, wherein a single cover overlies said adhesive faces of said plurality of said clips;

removing said cover, thereby exposing said adhesive faces of said clips;

locating said clips on said vehicle body and adhesively bonding said clips to said vehicle body, thereby mounting said molding onto said vehicle body.

13. The method as recited in claim 12, wherein at least some of said bearing surfaces extend to a position closely spaced from said molding, and wherein said method includes applying a force to said front face of said molding, deforming said molding rearwardly to contact said closely spaced bearing surfaces.

* * * * *